US008771065B2

(12) United States Patent
Okada

(10) Patent No.: US 8,771,065 B2
(45) Date of Patent: Jul. 8, 2014

(54) GAMING APPARATUS AND METHOD FOR PROVIDING GAME

(75) Inventor: Kazuo Okada, Tokyo (JP)

(73) Assignee: Universal Entertainment Corporation, Tokyo (JP)

(*) Notice: Subject to any disclaimer, the term of this patent is extended or adjusted under 35 U.S.C. 154(b) by 1525 days.

(21) Appl. No.: 12/000,315

(22) Filed: Dec. 11, 2007

(65) Prior Publication Data

US 2008/0167103 A1 Jul. 10, 2008

(30) Foreign Application Priority Data

Dec. 13, 2006 (JP) ................................ 2006-335766

(51) Int. Cl.
*G07F 17/32* (2006.01)
*A63F 13/52* (2014.01)

(52) U.S. Cl.
CPC ..................................... *G07F 17/32* (2013.01)
USPC ............................................... 463/31; 463/12

(58) Field of Classification Search
USPC ....................... 463/11-13, 20-22, 23, 30-34
See application file for complete search history.

(56) References Cited

U.S. PATENT DOCUMENTS

| | | | | |
|---|---|---|---|---|
| 5,221,083 | A * | 6/1993 | Dote | 463/32 |
| 6,270,409 | B1 * | 8/2001 | Shuster | 463/20 |
| 6,371,851 | B1 * | 4/2002 | Singer et al. | 463/13 |
| 6,612,927 | B1 * | 9/2003 | Slomiany et al. | 463/16 |
| 6,926,607 | B2 * | 8/2005 | Slomiany et al. | 463/20 |
| 7,811,165 | B2 * | 10/2010 | Slomiany et al. | 463/16 |
| 2003/0207707 | A1 * | 11/2003 | Slomiany et al. | 463/16 |
| 2004/0002377 | A1 * | 1/2004 | Staw et al. | 463/25 |
| 2004/0072608 | A1 * | 4/2004 | Toyoda | 463/17 |
| 2006/0084505 | A1 | 4/2006 | Yoseloff et al. | |
| 2006/0084506 | A1 | 4/2006 | Yoseloff et al. | |
| 2006/0111178 | A1 * | 5/2006 | Gallaway et al. | 463/25 |
| 2006/0258425 | A1 * | 11/2006 | Edidin et al. | 463/16 |
| 2006/0284378 | A1 * | 12/2006 | Snow et al. | 273/292 |
| 2007/0060258 | A1 * | 3/2007 | Duhamel | 463/16 |
| 2008/0200239 | A1 * | 8/2008 | Gilmore et al. | 463/22 |

FOREIGN PATENT DOCUMENTS

WO WO 2006088498 A1 * 8/2006

* cited by examiner

*Primary Examiner* — Bach Hoang
(74) *Attorney, Agent, or Firm* — Lexyoume IP Meister, PLLC

(57) ABSTRACT

A gaming apparatus includes: a first memory that stores dealer images of a plurality of dealer characters; a display device that displays the dealer image of one of the dealer characters; a betting unit that receives a bet operation input by a player; a second memory that stores a total amount of game media that are provided to the player as awards in accordance with results of a plurality of rounds of a game that are performed based on the bet operation; and a controller that determines whether the total amount has reached a predetermined amount and controls the display device to change the dealer image of the displayed dealer character to another dealer character when determined that the total amount has reached the predetermined amount.

4 Claims, 12 Drawing Sheets

GAMING APPARATUS AND METHOD FOR PROVIDING GAME

CROSS-REFERENCE TO THE RELATED APPLICATION(S)

The present application is based upon and claims priority from prior Japanese Patent Application No. 2006-335766, filed on Dec. 13, 2006, the entire content of which are incorporated herein by reference.

TECHNICAL FIELD

The present invention relates to a gaming apparatus that provides a game that is played with a dealer image being displayed and to a method for providing a game that is played with a dealer.

BACKGROUND

In casinos and game arcades, there are installed card gaming machines and card gaming tables for providing card games having various gaming manners such as Pai Gow Poker, Holdem Poker, and 7 Stud Poker called poker, baccarat, or Blackjack in which a dealer and a plurality of players are participated. Here, in the above-described card games, cards, on which symbols (for example, Ace of Heart) are represented, are used for playing a game. In the game, an award to be provided to a player is determined on the basis of a combination of the symbols of cards dealt to the player and a combination of the symbols of cards dealt to a dealer.

For example, a table or a card gaming machine which is used for playing Pai Gow Poker is disclosed in US 2006/0084505 and US 2006/0084506. Pai Gow Poker is a game in which seven cards are respectively dealt to a dealer and a plurality of players (maximum of six), the seven cards dealt to the dealer and each players are divided into sets of two cards and five cards, and winning the game or an award to be provided is determined by comparing combinations of symbols represented on the cards of each set.

In some of conventional card gaming machines, in order to improve reality of the game, an image of the dealer (dealer image) is configured to be displayed on a display. However, the displayed image of the dealer is always of the same type, that is, the image of a same character wearing the same costume. In addition, although there have been card gaming machines in which a character or costume of the dealer is changed, however, timings for the change are randomly determined.

Since the character or costume of the dealer changes on the basis of random timings that cannot be predicted by a player in the conventional card gaming machines, tensions and excitement of the player becomes smaller than those in a case where a game is played with a dealer who is a real person in casinos and gaming arcades.

SUMMARY

One of objects of the present invention is to provide a gaming apparatus and a method for providing a game in while providing tensions and excitement to a player playing the game by changing a dealer on the basis of the amount of game media being paid out.

According to a first aspect of the invention, there is provided a gaming apparatus including: a first memory that stores dealer images of a plurality of dealer characters; a display device that displays the dealer image of one of the dealer characters; a betting unit that receives a bet operation input by a player; a second memory that stores a total amount of game media that are provided to the player as awards in accordance with results of a plurality of rounds of a game that are performed based on the bet operation; and a controller that determines whether the total amount has reached a predetermined amount and controls the display device to change the dealer image of the displayed dealer character to another dealer character when determined that the total amount has reached the predetermined amount.

According to a second aspect of the invention, there is provided a gaming machine including: a first memory that stores dealer images of a plurality of dealer characters; a display device that displays the dealer image of one of the dealer characters; a betting unit that receives a bet operation input by a player; a second memory that stores a loss count that indicates the number of lost rounds of a game that are performed based on the bet operation; and a controller that determines whether the loss count has reached a predetermined count and controls the display device to change the dealer image of the displayed dealer character to another dealer character when determined that the loss count has reached the predetermined count.

According to a third aspect of the invention, there is provided a method for providing a player a game, the method including: determining whether a total amount of game media, which are provided to the player as awards in accordance with results of a plurality of rounds of the game that are performed based on a bet placed by the player, has reached a predetermined amount; changing a dealer who presently deals the game to another dealer when determined that the total amount has reached the predetermined amount; and provides the game to the player by the changed dealer.

According to a fourth aspect of the invention, there is provided a method for providing a player a game, the method including: determining whether a loss count, which indicates the number of lost rounds of the game that are performed based on a bet placed by the player, has reached a predetermined count; changing a dealer who presently deals the game to another dealer when determined that the loss count has reached the predetermined count; and provides the game to the player by the changed dealer.

DETAILED DESCRIPTION

Hereinafter, gaming apparatuses according to first and second embodiments of the present invention which are implemented in baccarat gaming machines will be described with reference to the accompanying drawings. Here, the baccarat gaming machine according to the first or second embodiment is one type of multi-player gaming machine having a plurality of player terminals. Players using the baccarat gaming machine place bets on the prediction of a winner between a BANKER and a PLAYER, and an award is paid out on the basis of the winner of the game.

Figure 1:
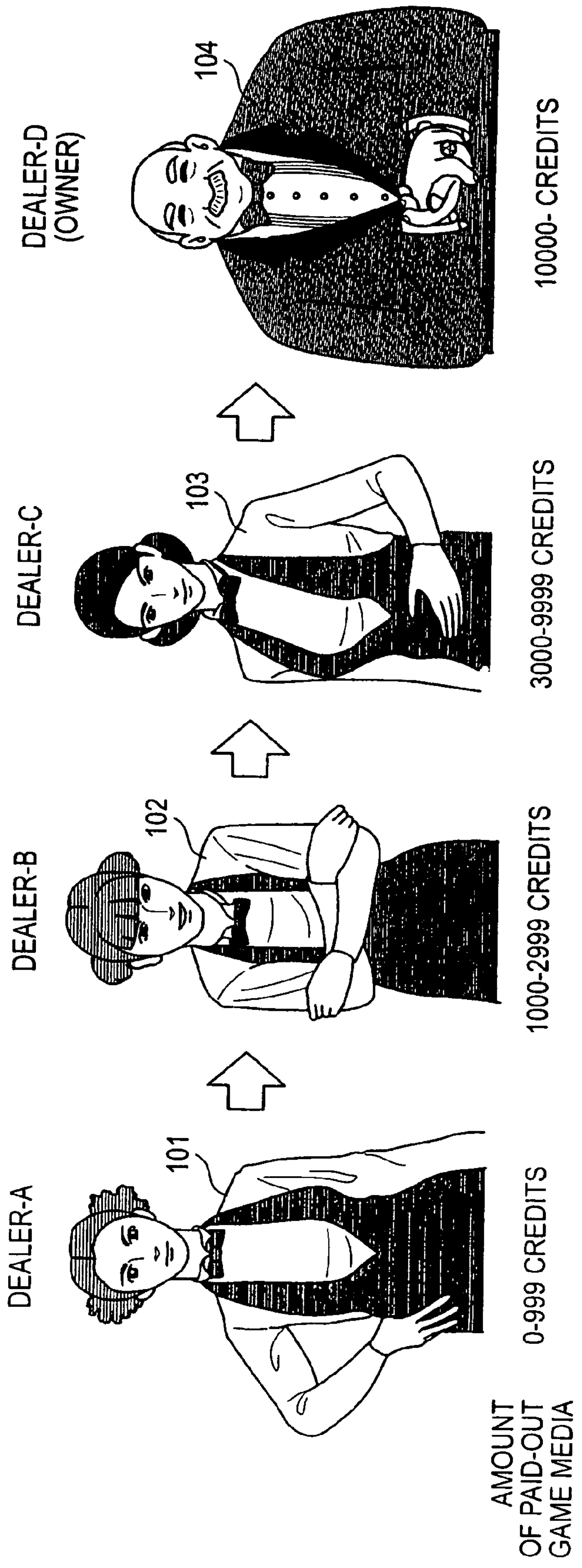
FIG. 1 is a diagram showing example images that are displayed in a baccarat gaming machine according to a first embodiment of the present invention.

In the baccarat gaming machine according to the embodiments of the present invention, as shown in FIG. 1, an image of a virtual dealer (banker) responsible for progressing the game is changed on the basis of the accumulated amount of gaming media paid out from the gaming machine. In particular, the image of dealer A is used when the amount of paid-out credits (one credit corresponds to one medal) is equal to or less than 999 credits. When the amount of the paid-out credits is in the range of 1000 to 2999, the image of dealer B is used. When the amount of the paid-out credits is in the range of 3000 to 9999, the image of dealer C is used. When the amount of the paid-out credits is equal to or greater than 10000 credits, the image of dealer D is used. The game progresses with one of the images 101-104 of dealers A, B, C, or D corresponding to the amount of paid-out game media displayed on a front display 21 (see FIGS. 8 and 9). In the baccarat gaming machine according to embodiments of the present invention, when a player wins the game in a state that the image 104 of dealer D who looks like an owner of a casino is displayed on the front display 21, an award having a relatively high value is provided, compared with a case where a game is won in a state that an image of a dealer other than dealer D is displayed.

In the baccarat gaming machine described below, as game media, medals or electronic value information (credits) corresponding thereto is used. However, the game media applicable to the present invention is not limited thereto, and, for example, coins, bills, tokens, electronic cash, or tickets may be used as the game media.

First Embodiment

Figure 2:
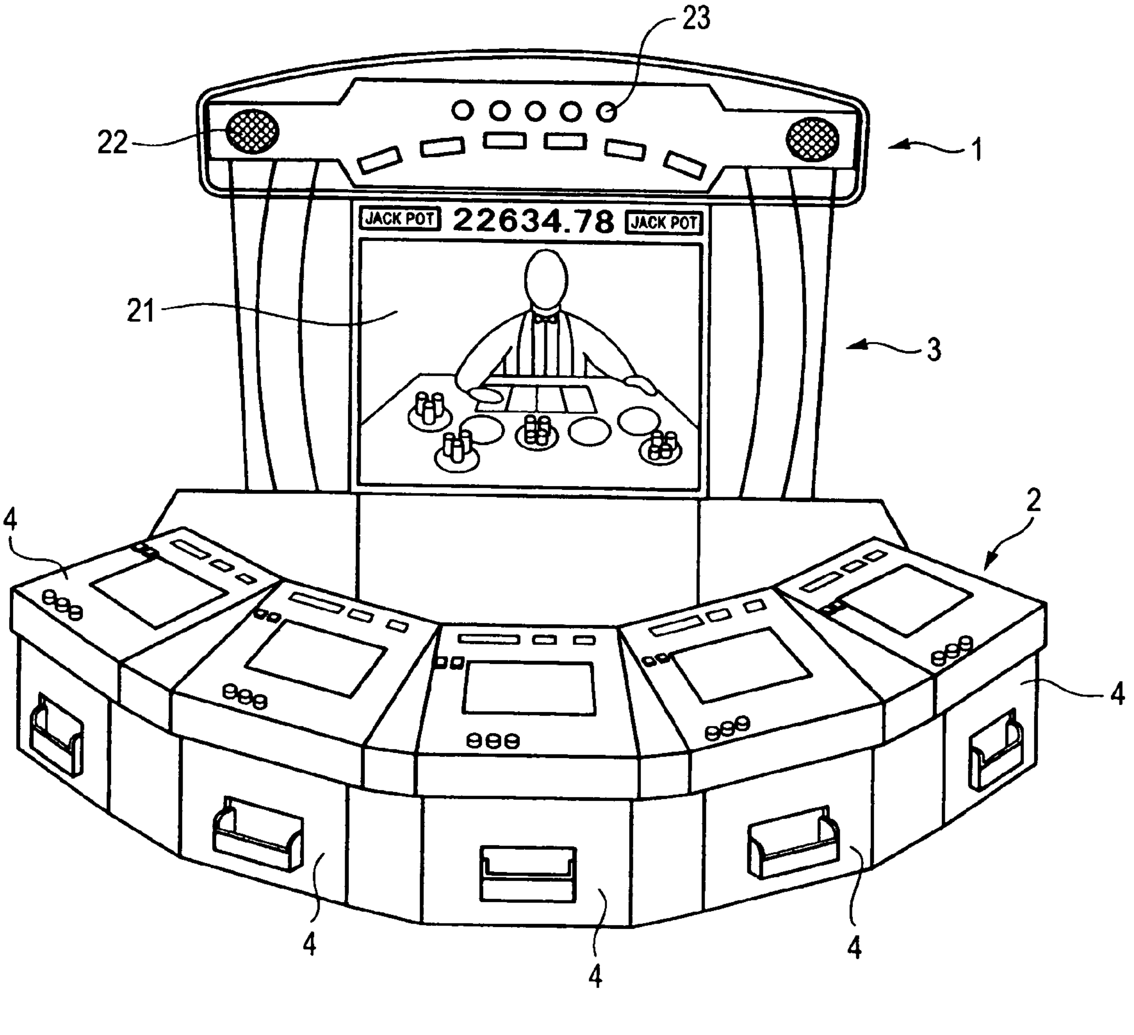
FIG. 2 is a diagram showing an appearance of the baccarat gaming machine according to the first embodiment.

First, the schematic configuration of the baccarat gaming machine 1 according to a first embodiment will be described with reference to FIG. 2. FIG. 2 is a diagram showing the appearance of the baccarat gaming machine according to the first embodiment.

The baccarat gaming machine 1 according to the first embodiment is basically configured by a table unit 2 in which a player sits for playing the game and a panel unit 3 that is disposed on a rear side of the table unit 2 and displays animation images of a virtual dealer or the like.

Figure 3:
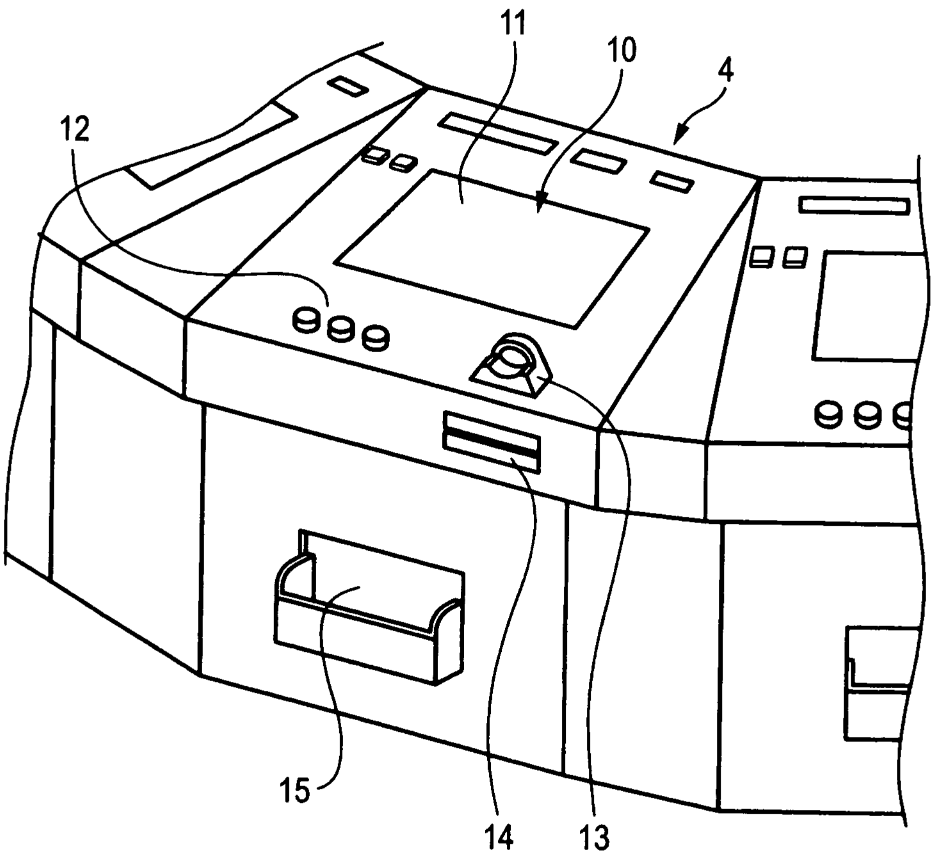
FIG. 3 is a diagram showing an appearance of a player terminal according to the first embodiment.

Hereinafter, the table unit 2 will be described. The table unit 2 has a plurality (five in FIG. 2) of player terminals 4, which are called stations, being arranged in a fan shape. FIG. 3 is a diagram showing the appearance of one player terminal 4 according to the first embodiment.

The player terminal 4 serves as a betting unit that receives a bet operation performed for taking part in a game from a player. As shown in FIG. 3, the player terminal 4 includes: a liquid crystal display 10 for displaying a bet screen (see FIG. 6) to be described later, the result of the game, or the like; a touch panel 11 that is disposed on a front side of the liquid crystal display 10 and is used for selection of a betting target or a selective operation of a button displayed on the liquid crystal display 10 for setting a bet amount; operation buttons 12 used for a payout operation or the like; a coin insertion slot 13 for inserting coins or medals; a bill insertion slot 14 for inserting bills; and a coin payout opening 15 for paying out coins or medals corresponding to remaining credits to the player at a time when a payout operation is performed.

The panel unit 3 includes: a front display 21 that displays an image of a dealer dealing cards and receiving and giving chips, and an image of the dealt cards; a speaker 22 that is disposed on the top of the front display 21 and outputs music and sound effects in accordance with progress of a game; and an LED 23 that is turned on for various types of representation.

In the baccarat gaming machine 1, a player playing a game sits on the front side of the player terminal 4 and places a bet on one of the BANKER and the PLAYER by using a bet screen displayed on the liquid crystal display 10. Thereafter, on the front display 21, an effect image for determining one of the BANKER and the PLAYER to be a winner (there may be a drawn game) on the basis of the types of the cards dealt by a dealer. In the player terminals 4, predetermined amounts of credits on the basis of bet amounts (numbers of credits) and award multiplication factors are provided to players who have betted on the winner among the PLAYER and the BANKER.

When the accumulated amount of game media provided to the player terminals 4 has reached one of predetermined amounts (in the first embodiment, 1000 credits, 3000 credits, or 10000 credits), the image of the dealer displayed on the front display 21 is changed to the image of a dealer corresponding to the reached amount of game media. Then, a dealer responsible for the progress of a game thereafter is displayed as the image of the changed dealer.

Figure 4:
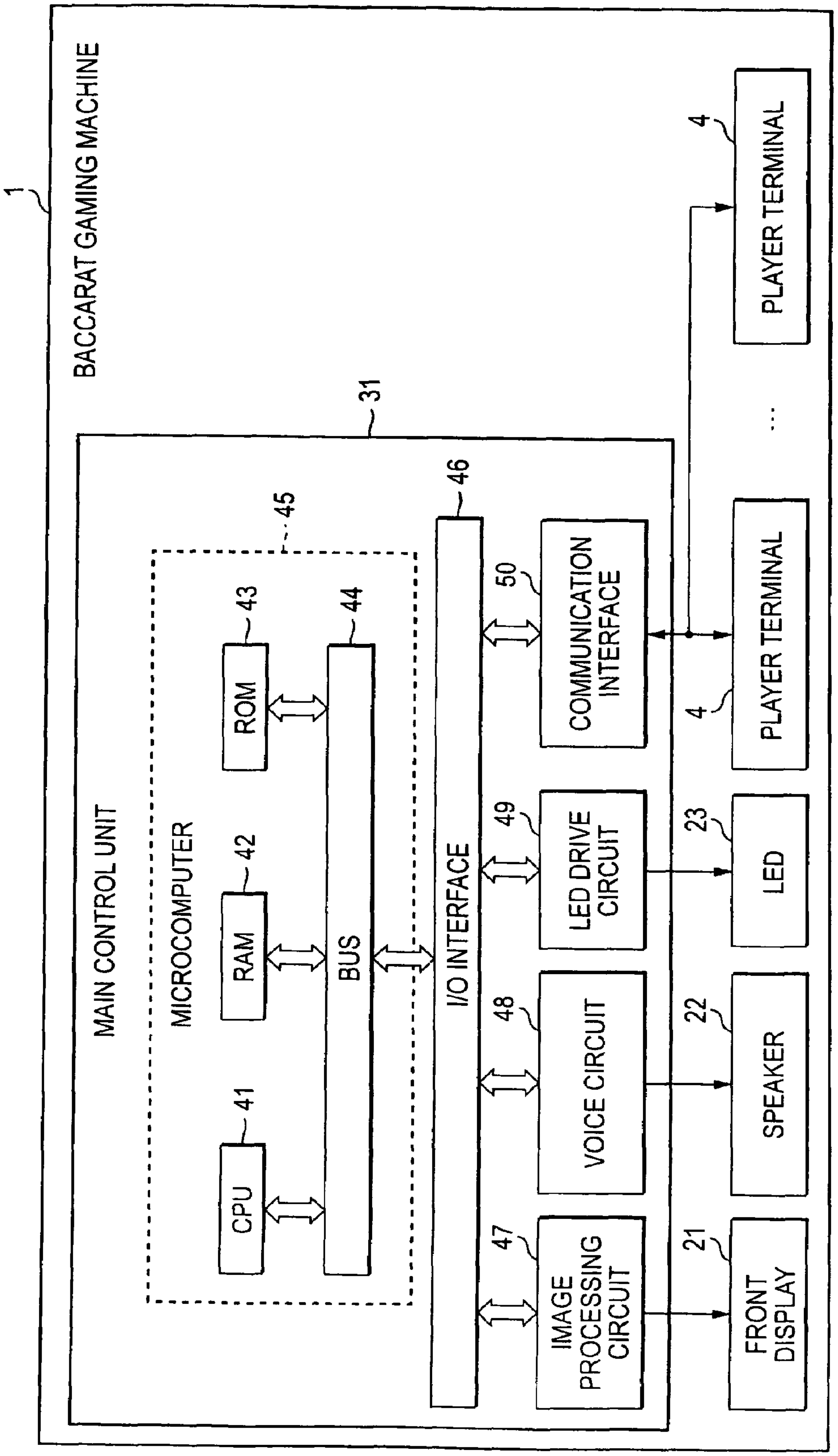
FIG. 4 is a block diagram schematically showing a control system of the baccarat gaming machine according to the first embodiment.

Next, a configuration of a control system of the baccarat gaming machine 1 will be described with reference to FIG. 4. FIG. 4 is a schematic block diagram of the control system of the baccarat gaming machine 1 according to the first embodiment.

The baccarat gaming machine 1 according to the first embodiment, as shown in FIG. 4, includes a main control unit 31, a plurality of player terminals 4 connected to the main control unit 31, and various peripheral devices.

The main control unit 31 has a microcomputer 45 that includes a CPU 41, a RAM 42, a ROM 43, and a bus 44 for data transmission therebetween, as its core component. In the ROM 43, various programs for performing processes for controlling the baccarat gaming machine 1, data tables, and the like are stored. The RAM 42 is a memory for temporally storing data (amount data) that indicates the amounts of paid-out game media in each player terminal 4 or various types of data calculated by the CPU 41. In addition, in the ROM 43, images 101-104 of four types of dealers A-D having characters different from each other are stored in correspondence with different amounts of game media (dealer A corresponding to 0 to 999 credits, dealer B corresponding to 1000 to 2999 credits, dealer C corresponding to 3000 to 9999 credits, and dealer D corresponding to 10000 credits and more).

The CPU 41 is connected to an image processing circuit 47, a voice circuit 48, an LED drive circuit 49, and a communication interface 50 through an I/O interface 46.

The main control unit 31 receives information on bet operations performed by players such as a bet amount or the like from the player terminals 4 and determines whether a condition for starting a game is satisfied. When the game is started, the main control unit 31 determines the result of the game (one among winning of the BANKER, winning of the PLAYER, and draw) and sends the determined result of the game to the player terminals 4. Subsequently, the player terminals 4 increase or decrease stored credits on the basis of the result of the game received from the main control unit 31.

The main control unit 31 outputs a signal for displaying an image on the front display 21 and controls the speaker 22 and the LED 23. When the main control unit 31 determines that the amount of the paid-out game media stored in the RAM 42 has reached a predetermined amount, the main control unit 31 sets the image of a dealer, from among images 101-104 of four types of dealers stored in the ROM 43, corresponding to the reached amount of the game media, as the image of the virtual dealer. Then, in games thereafter, the main control unit 31 controls the front display 21 so as to display the set image of the dealer and progresses the game.

Figure 5:
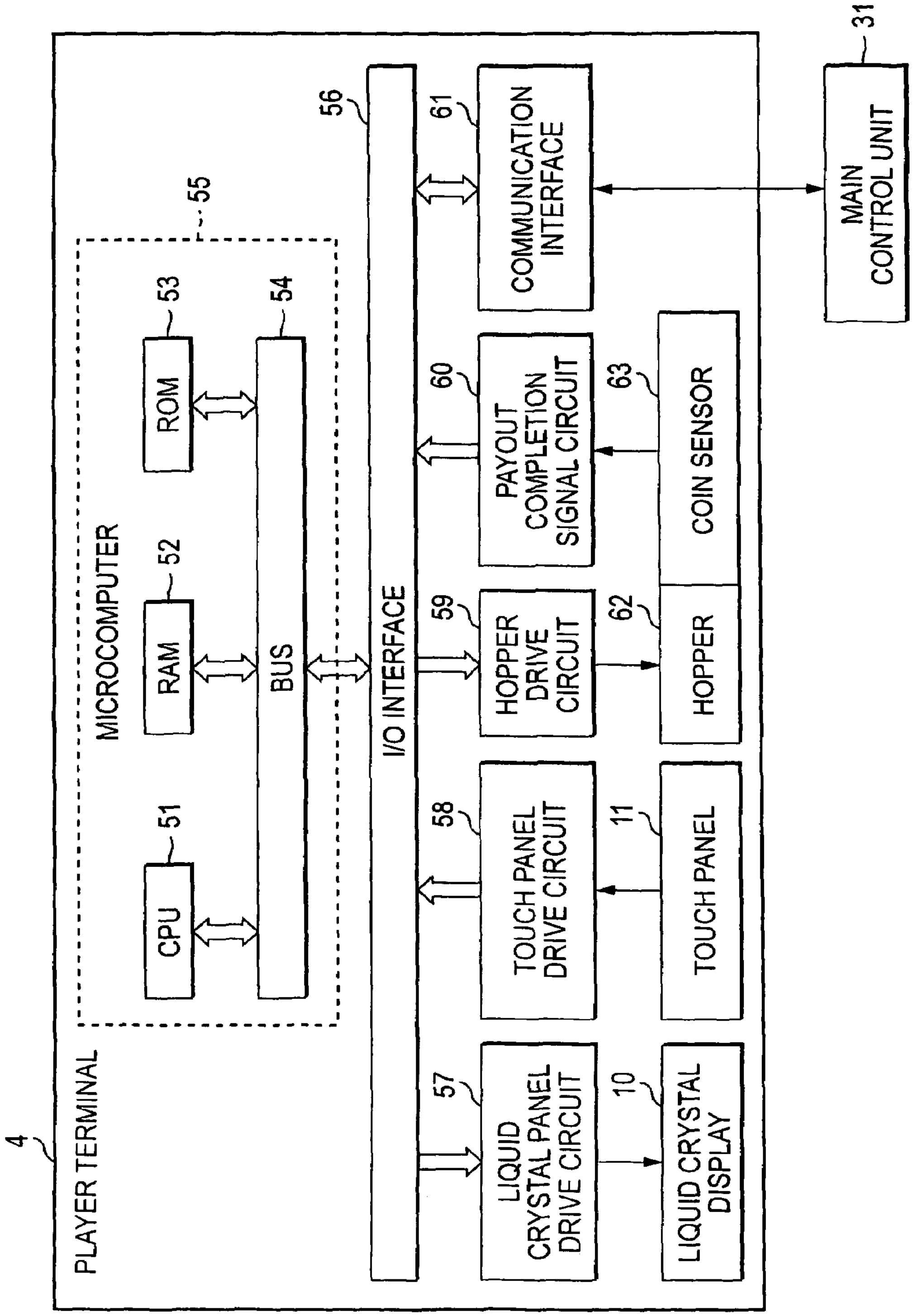
FIG. 5 is a block diagram schematically showing a control system of the player terminal according to the first embodiment.

Next, a configuration of a control system of the player terminal 4 will be described with reference to FIG. 5. FIG. 5 is a schematic diagram showing the control system of the player terminal 4 according to the first embodiment.

The player terminal 4 according to the first embodiment, as shown in FIG. 5, has a microcomputer 55 that basically includes a CPU 51, a RAM 52, a ROM 53, and a bus 54 for data transmission therebetween, as its core component. In the ROM 53, various programs for performing processes required for controlling the player terminal 4, data tables, and the like are stored. The RAM 52 is a memory for temporally storing the number of credits currently stored in the player terminal 4, abetting target betted by the player, the bet amount (number of credits) betted on the betting target, award multiplication factors, and various types of data calculated by the CPU 51.

The CPU 51 is connected to the liquid crystal panel drive circuit 57, a touch panel drive circuit 58, a hopper drive circuit 59, a payout completion signal circuit 60, and a communication interface 61 though an I/O interface 56. The liquid crystal display 10 is connected to the liquid crystal drive circuit 57, the touch panel 11 is connected to the touch panel drive circuit 58, a hopper 62 is connected to the hopper drive circuit 59, and a coin detection unit 63 is connected to the payout completion signal circuit 60.

The CPU 51 determines the betting target (one of the BANKER and the PLAYER) betted by the player and the bet amount (number of credits) that has been placed on the basis of operation information output from the touch panel 11, stores the betting target and the bet amount in the RAM 52, and transmits the betting target and the bet amount to the main control unit 31. The CPU 51 increases or decreases the stored credits on the basis of the result of the game sent from the main control unit 31.

The CPU 51 controls output of a signal for an image to be displayed on the front display 21 and payout of coins, which is performed by the hopper 62 and the coin detection unit 63, from the coin payout opening 15.

Figure 6:
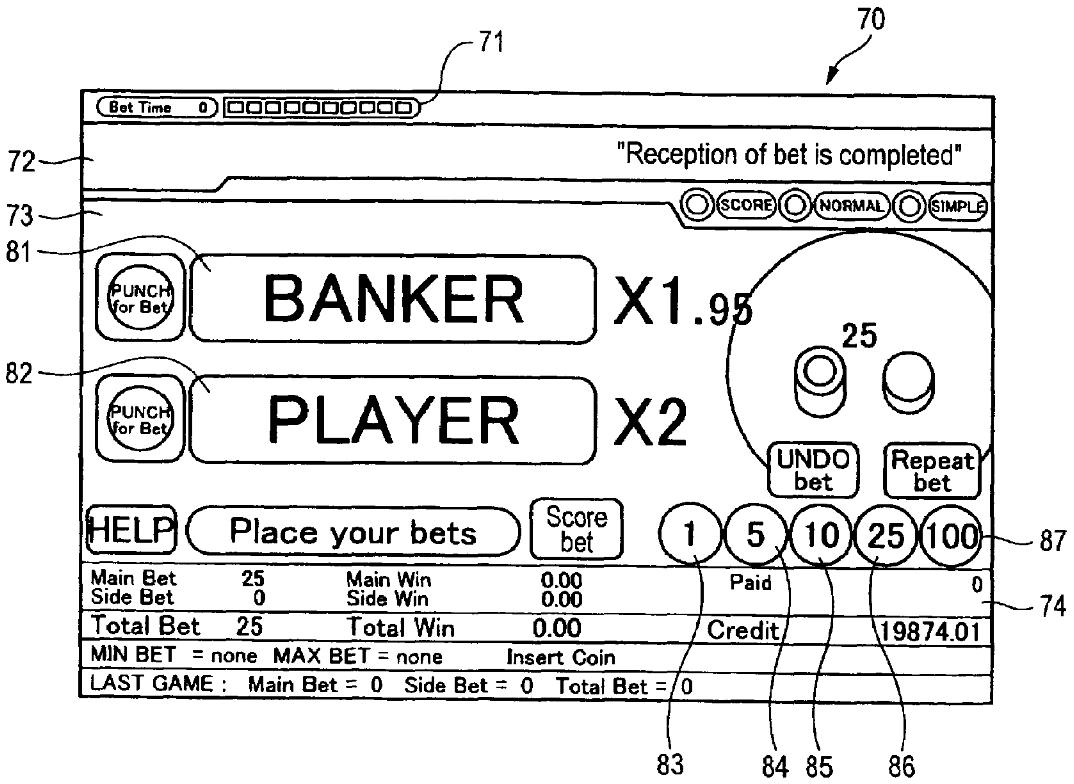
FIG. 6 is a schematic diagram showing a bet screen displayed on a liquid crystal display of the player terminal according to the first embodiment.

Next, a bet screen 70 that is displayed on the liquid crystal display 10 of the player terminal 4 in a case where a baccarat game is performed by the baccarat gaming machine 1 according to the embodiment will be described with reference to FIG. 6. FIG. 6 is a schematic diagram showing a bet screen 70 displayed on the liquid crystal display 10 of the player terminal 4. In the baccarat gaming machine 1 according to the embodiment, the player performs a bet operation for betting a specific amount of credits on one of the BANKER and the PLAYER by using the bet screen 70 and the touch panel 11.

As shown in FIG. 6, the bet screen 70 is formed by a timer display section 71 for displaying a remaining time in a bet period, a comment display section 72 on which the amount of a difference between credits betted on the betting targets, guide information, or the like is displayed, a main display section 73 having the betting targets on which the player can place a bet and the bet amount displayed thereon, and an information display section 74 on which the current state of the game, the result of the game, and the like.

In the main display unit 73, area buttons 81 and 82 used for the player's determining the betting target are provided. The player can set the BANKER as the betting target by selecting the area button 81. To the contrary, the player can set the PLAYER as the betting target by selecting the area button 82.

To the right side of the area buttons 81 and 82, award multiplication factors are displayed. When the betting target betted by the player wins, credits corresponding to an amount resulting from multiplying the bet amount and the award multiplication factor together are paid out.

In the main display section 73, bet buttons 83 to 87 used for determining the bet amount betted on the betting target by the player are provided. The player can add one credit to the bet amount betted on the betting target by selecting the bet button 83. The player can add five credits to the bet amount betted on the betting target by selecting the bet button 84. The player can add ten credits to the bet amount betted on the betting target by selecting the bet button 85. The player can add 25 credits to the bet amount betted on the betting target by selecting the bet button 86. The player can add 100 credits to the bet amount betted on the betting target by selecting the bet button 87.

Figure 7A:
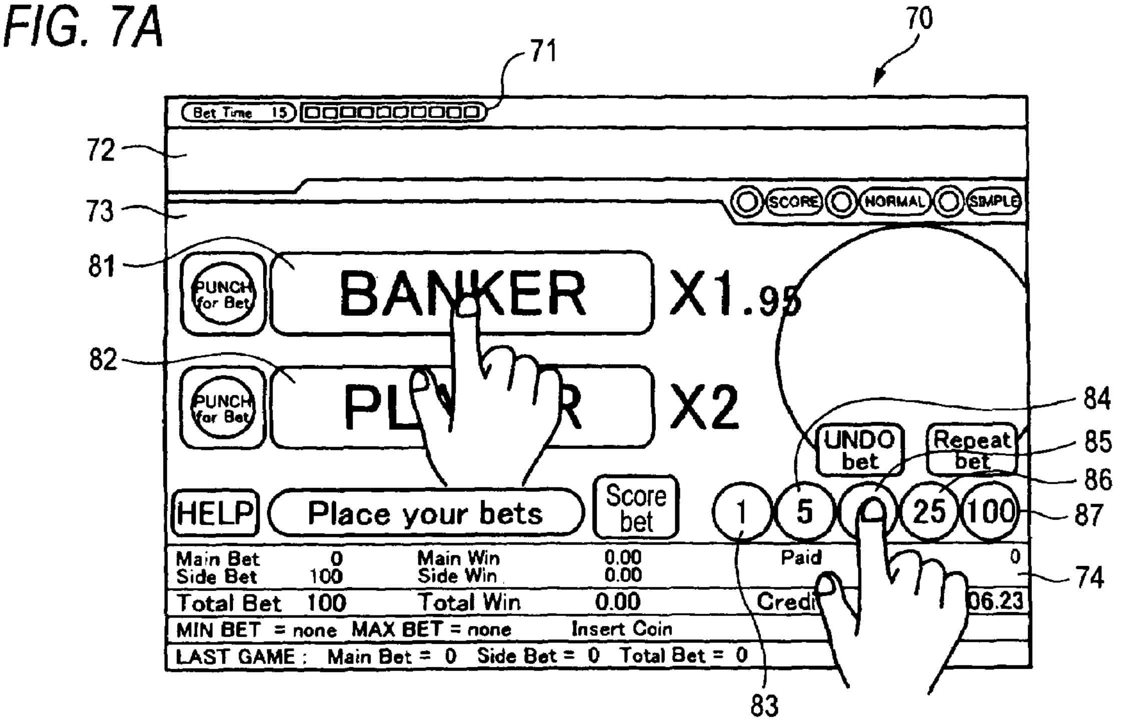
FIGS. 7A and 7B are diagrams illustrating an example operation and a bet screen in a case where ten credits are to be betted on a BANKER, which is one of targets to bet.
Figure 7B:
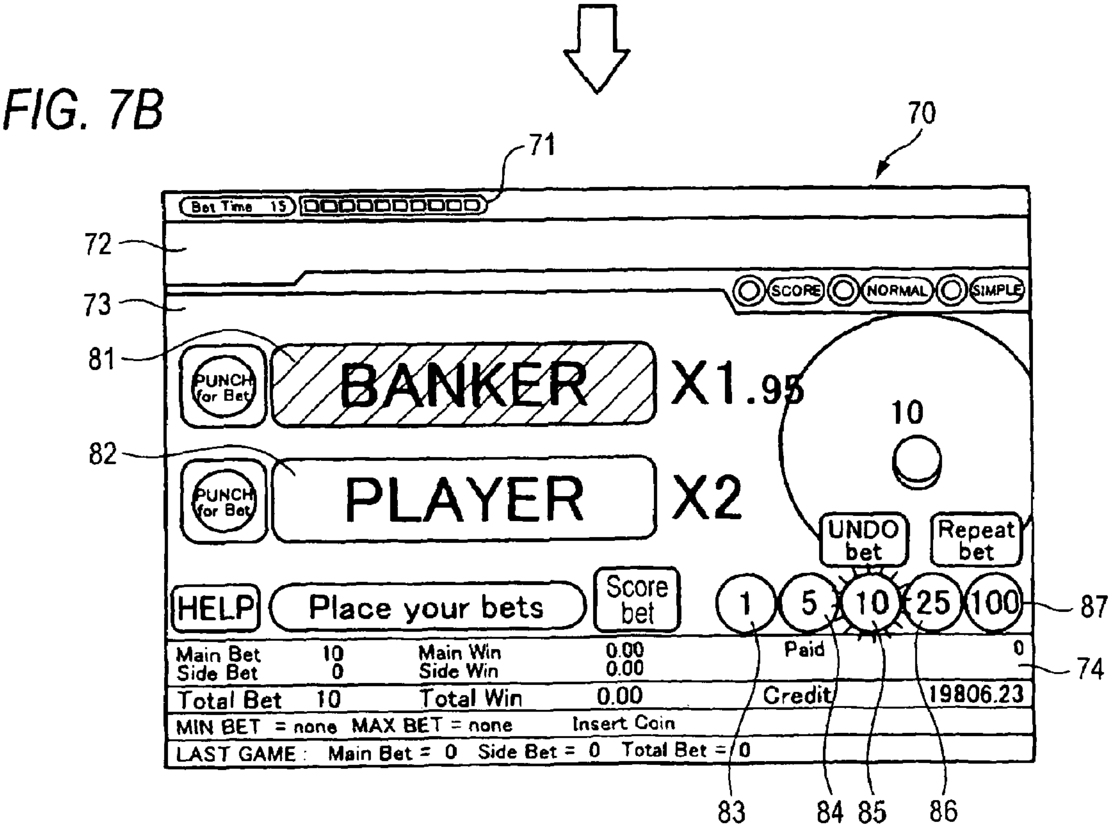

For example, FIGS. 7A and 7B illustrate an operation method and a bet screen in a case where ten credits are to be betted on the BANKER that is the betting target, as a detailed example. As shown in FIG. 7A, ten credits are betted on the BANKER by the player's touching the bet button 85 and the area button 81 with his finger (see FIG. 7B).

In the comment display section 72, a message for supporting the progress of the game is displayed. In the comment display section 72, for example, when the remaining time in the bet period is equal to or less than five seconds, a comment of "Soon, the reception of the bet will be completed" is displayed, and when the remaining time in the bet period is zero seconds, a comment of "The reception of the bet is now completed" is displayed.

Next, a main screen 91 displayed on the front display 21 in a case where a baccarat game is performed by using the baccarat gaming machine 1 according to the embodiment will be described with reference to FIGS. 8 and 9.

Figure 8:
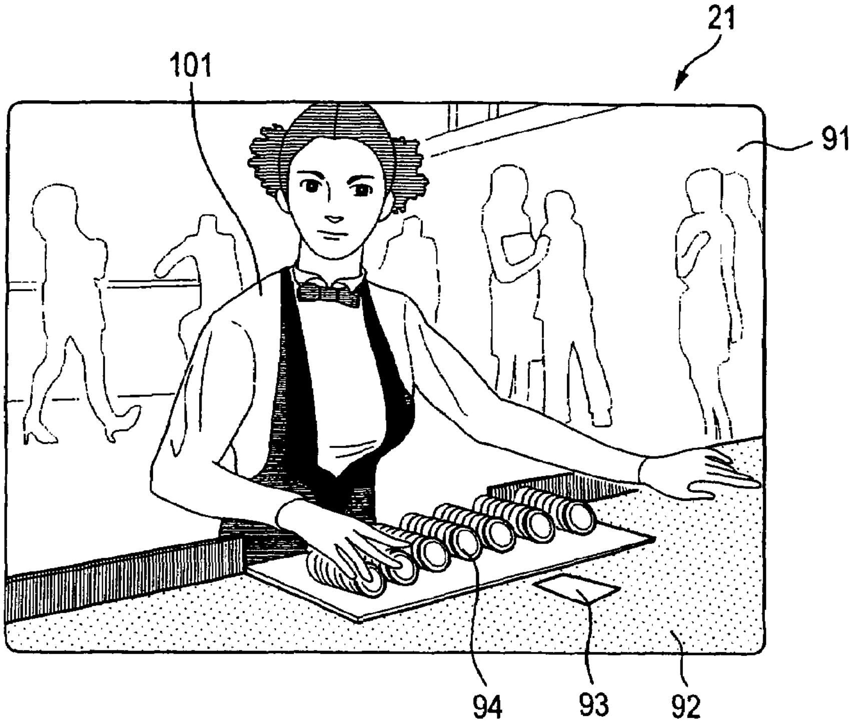
FIG. 8 is a diagram showing a main screen in a case where an image 101 of a dealer A is displayed.
Figure 9:
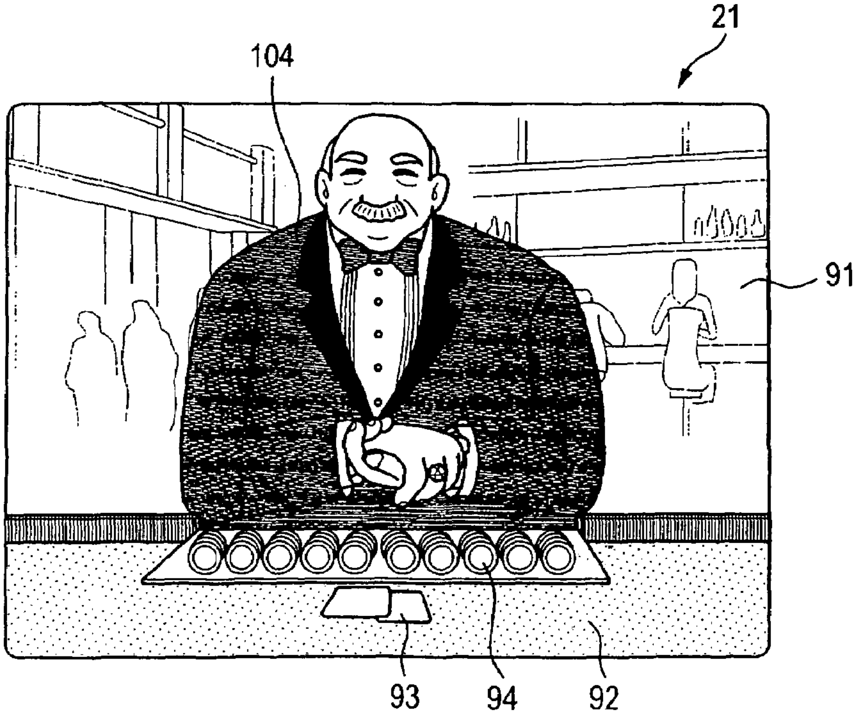
FIG. 9 is a diagram showing a main screen in a case where an image 104 of a dealer D is displayed.

FIGS. 8 and 9 are diagrams showing a main screen 91 displayed on the front display 21. In the baccarat gaming machine 1 according to the embodiment, in order to improve reality of the game, an animated image of a virtual dealer performing dealing cards or the like in accordance with the progress of the game is displayed on the main screen 91. Then, the image of the dealer is changed to the image of a different type on the basis of the amount of the game media paid out from the player terminals 4. In particular, the image of a dealer, from among four types of images having characters different from each other, in correspondence with the amount of the paid-out game media is displayed on the main screen 91 in the following games. For example, FIG. 8 shows the main screen 91 displayed during a game that is performed when the amount of the paid-out game media in the baccarat gaming machine 1 is in the range of 0 to 999 credits. On the other hand, FIG. 9 shows the main screen 91 displayed during a game that is performed when the amount of the paid-out game media in the baccarat gaming machine 1 is equal to or greater than 10000 credits.

In addition, in the approximate center of the main screen 91, an image 92 of a game table, an image 93 of dealer cards dealt to the dealer, and an image 94 of chips that are paid between the dealer and the player are displayed. The images 101-104 of the dealers A-D represent dealing cards or paying out the chips on the game table in accordance with progress of the game.

Figure 10:
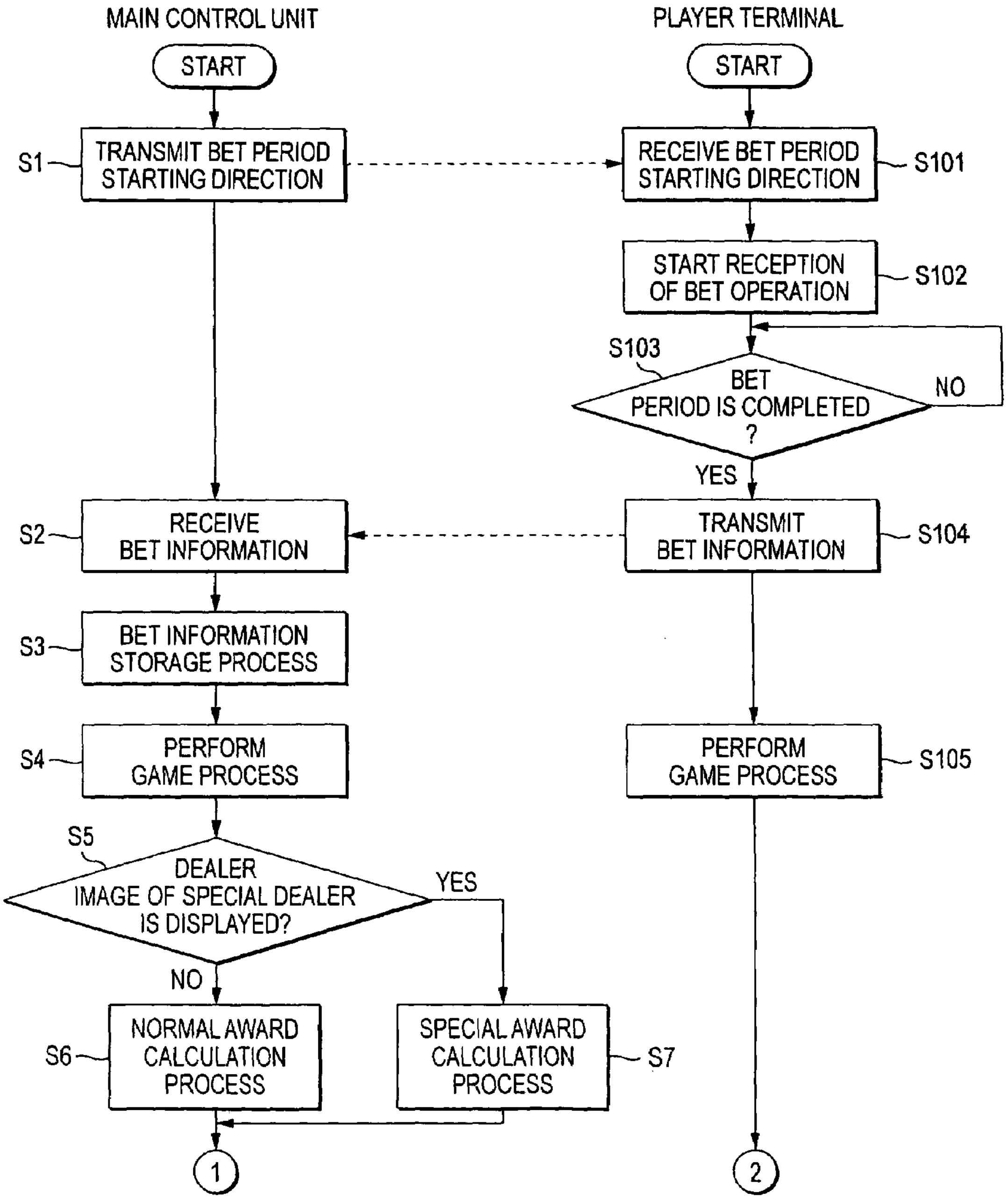
FIG. 10 is a flowchart of a main game processing program of the baccarat gaming machine according to the first embodiment.
Figure 11:
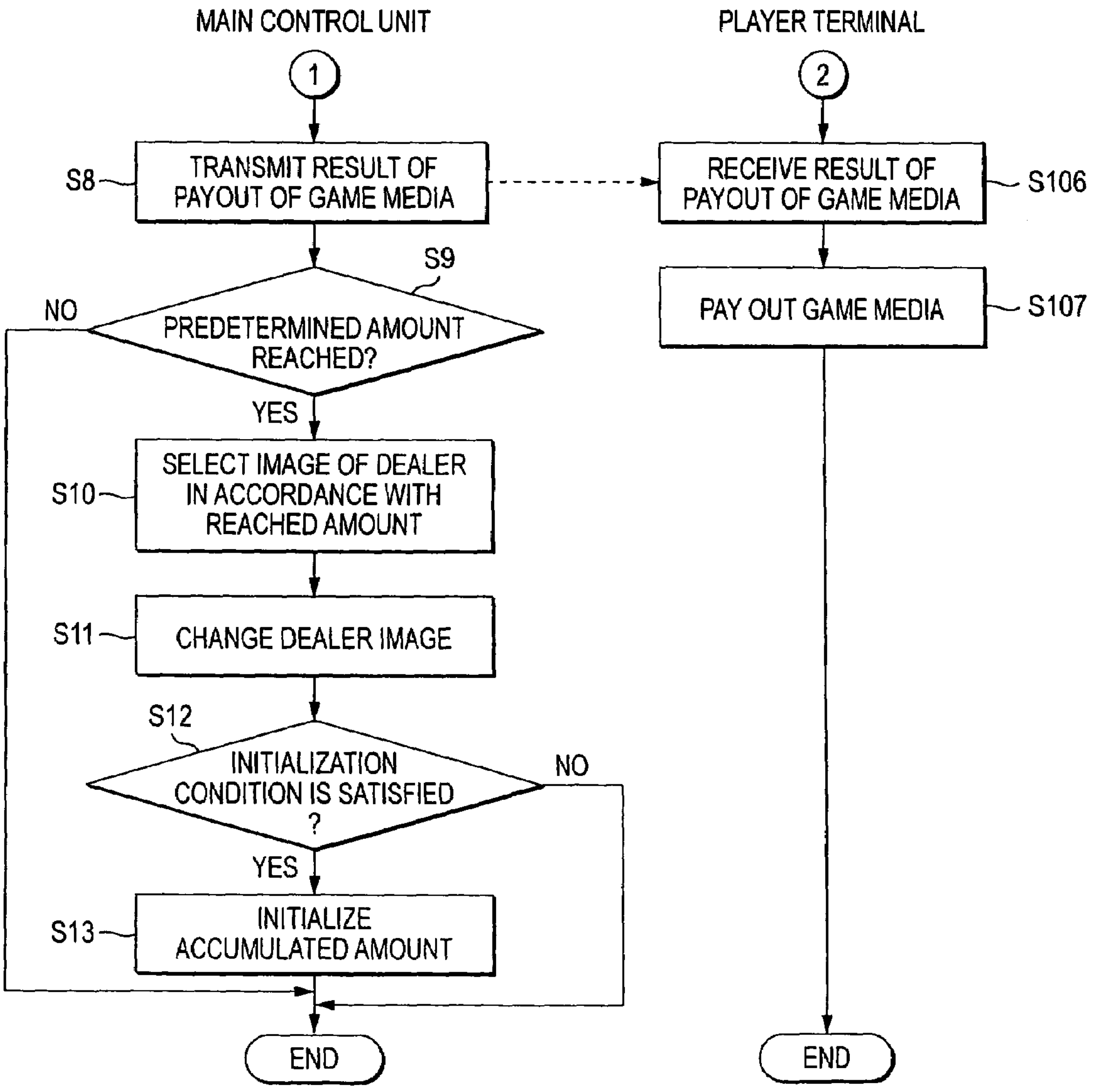
FIG. 11 is a flowchart of the main game processing program of the baccarat gaming machine according to the first embodiment.

Next, in the baccarat gaming machine 1 according to the embodiment, a main game processing program executed by the CPU 41 of the main control unit 31 and a main game processing program on the player terminal side which is performed by the CPU 51 of the player terminal 4 will be described with reference to FIGS. 10 and 11. The programs represented by flowcharts shown in FIGS. 10 and 11 are stored in the RAM 42 or the ROM 43 which is included in the main control unit 31 and the RAM 52 or the ROM 53 which is included in the player terminal 4 and are executed at predetermined intervals by the CPU 41 and the CPU 51.

First, the main game processing program executed by the main control unit 31 will now be described with reference to FIGS. 10 and 11. In Step (hereinafter, abbreviated as "S") 1, the CPU 41 transmits directions for starting the bet period, during which bet operations performed by the players are received, to the player terminals 4.

Thereafter, in S2, the CPU 41 receives bet information transmitted from the player terminals 4. Here, the bet information includes information indicating: a betting target (one of the BANKER and the PLAYER) on which the player has betted; and the bet amount (the number of credits) betted on the betting target.

Subsequently, in S3, the CPU 41 stores the bet information received in S2 in the RAM 42.

Next, in S4, the CPU 41 starts a game process. In the game process, a process for determining one of the BANKER and the PLAYER as a winner is performed.

Here, in the game process of S4, in order to improve reality of the game, an animated image of a virtual dealer performing dealing of cards or the like in accordance with the progress of the game is displayed on the front display 21 (see FIGS. 8 and 9). The image of the dealer is changed to an image of different type in S11, to be described later, on the basis of the amount of the game media paid out from the player terminals 4.

Next, in S5, the CPU 41 determines whether the image 104 of dealer D who is the special dealer is displayed on the front display 21. Here, while dealers A to C are adult females, dealer D is represented as a middle-aged casino owner who has a completely different appearance from other dealers A to C.

When it is determined that one of the images 101 to 103 of the dealers A to C is displayed on the front display 21 (S5: NO), the amount of game media to be paid out in each player terminal 4 is calculated on the basis of the bet information received in S2 and the result of the game determined in S4 (S6). In particular, when the player has betted on the BANKER and the BANKER wins (that is, when the player wins the game), game media corresponding to 1.95 times the amount of betted game media are calculated as the amount of payout game media. On the other hand, when the player has betted on the PLAYER and the PLAYER wins (that is, when the player wins the game), game media corresponding to twice the amount of betted game media are calculated as the amount of the payout game media. On the other hand, when the BANKER and the PLAYER draw with each other, the amount of betted game media are directly calculated as the amount of the payout game media. On the other hand, when the player has betted on the BANKER and the PLAYER wins or when the player has betted on the PLAYER and the BANKER wins (that is, when the player loses the game), zero credits (that is, there is no payout) are calculated as the amount of the payout game media.

On the other hand, when it is determined that the image 104 of dealer D is displayed on the front display 21 (S5: YES), the amount of game media to be paid out to each player terminal 4 is calculated by using a special calculation method different from S6 (S7). In particular, when the player has betted on the BANKER and the BANKER wins (that is, when the player wins the game), game media of 3.9 times the amount of betted game media are calculated as the amount of payout game media. On the other hand, when the player has betted on the PLAYER and the PLAYER wins (that is, when the player wins the game), game media of four times the amount of betted game media are calculated as the amount of the payout game media. On the other hand, when the BANKER and the PLAYER draw with each other, or when the player has betted on the BANKER and the PLAYER wins or when the player has betted on the PLAYER and the BANKER wins (that is, when the player loses the game), the amount of the payout game media is calculated by using the same method as in S6. The amounts of the game media calculated in S6 and S7 are accumulated in the RAM 42.

Subsequently, in S8, the CPU 41 transmits payout result information on the amount of the game media calculated in S6 or S7 to the player terminals 4. The player terminals 4 that have received the payout result information pay out the game media corresponding to the determined amounts calculated in S6 or S7 in accordance with the received information as an award for the player who wins the game.

Next, in S9, the CPU 41 determines whether the accumulated amount of game media paid-out to the player terminals 4 which is stored in the RAM 42 has reached one of the predetermined amounts. Here, the predetermined amounts are the amounts of game media corresponding to the images 101-104 of the four types of dealers A-D. The predetermined amounts of game media corresponding to dealer A, B, C, and D are in the range of 0 to 999 credits, in the range of 1000 to 2999 credits, in the range of 3000 to 9999 credits, and 10000 credits or more. Thus, when the accumulated amount of the payout game media is equal to or greater than 1000 credits, 3000 credits, or 10000 credits, the accumulated amount of the payout game media is determined to reach one of the predetermined amounts.

When the accumulated amount of the payout game media has not reached one of the predetermined amounts (S9: NO), the CPU 41 completes the main game processing program without changing the image of the dealer currently displayed on the front display 21.

On the other hand, when it is determined that the accumulated amount of the payout game media has reached one of the predetermined amounts (S9: YES), the process proceeds to S10. In S10, the CPU 41 selects the image of a dealer corresponding to the amount of the game media which is determined to be reached, from among the images 102 to 104 of dealers B to D. In particular, when it is determined that the amount of the payout game media has reached 1000 credits, the image 102 of dealer B is selected. On the other hand, when it is determined that the amount of the payout game media has reached 3000 credits, the image 103 of dealer C is selected.

On the other hand, when it is determined that the amount of the payout game media has reached 10000 credits, the image 104 of dealer D is selected.

Then, in S11, the CPU 41 controls the front display 21 to change the image of the dealer currently displayed thereon on the basis of the result of selection in S10. In particular, the image of the dealer which has been displayed up to the previous game is changed to the image of the dealer newly selected in S11.

Next, in S12, the CPU 41 determines whether a condition for initializing the accumulated amount of the game media, which is stored in the RAM 42, is satisfied. Here, the condition for initializing the accumulated amount of the game media, for example, may be a condition that 24 hours have passed from the previous initialization time point, a condition that the accumulated amount of the game media has reached a predetermined amount (for example, 20000 credits), a condition that a manual reset operation is performed, or the like.

When the condition for initializing the accumulated amount of the game media is determined to be satisfied (S12: YES), in S13, the CPU 41 initializes (resets) the accumulated amount stored in the RAM 42. On the other hand, when the condition for initializing the accumulated amount of the game media is determined not to be satisfied (S12: NO), the main game processing program is completed. When a game is performed consecutively thereafter, the process proceeds back to S1.

Next, the main game processing program executed by the player terminal 4 will be described with reference to FIGS. 10 and 11. In S101, the CPU 51 receives a bet period starting direction from the main control unit 31.

Thereafter, in S102, the CPU 51 displays a bet screen 70 on the liquid crystal display 10 and determines the betting target (one of the BANKER and the PLAYER) on which the player has betted and the bet amount (number of credits) on the basis of the operation information transmitted from the touch panel 11.

Next, in S103, the CPU 51 determines whether the bet period has been completed. In particular, it is determined whether a predetermined time (for example, 20 seconds) has elapsed after the reception of the bet operation was started in S102.

When it is determined that the bet period has not been completed (S103: NO), the reception of the bet operation is continued. On the other hand, when it is determined that the bet period has been completer (S103: YES), the process proceeds to S104.

In S104, the CPU 51 transmits bet information to the main control unit 31. Here, the bet information includes the betting target (one of the BANKER and the PLAYER) on which the player has betted and the bet amount (number of credits) betted on the betting target.

In S105, the CPU 51 starts a game process in correspondence with the game process of the main control unit 31 which is performed in S4.

Next, in S106, the CPU 51 receives payout result information from the main control unit 31. Here, the payout result information is information on the amount of game media paid out as an award in the player terminal 4 for this game. The payout result information is determined on the basis of the amount of game media betted by the player and the award multiplication factor. The contents of the awards to be paid out are different in a case where one of the images 101 to 103 of dealers A to C is displayed on the front display 21 and in a case where the image 104 of the dealer D is displayed. In other words, it is configured to pay out more game media in a case where the image 104 of dealer D is displayed than those in a case where one of the images 101 to 103 of dealers A to C is displayed, even though winning types in the cases are the same with each other.

Then, in S107, the credits are paid out on the basis of the payout result information that has been received in S106.

As described above, in the baccarat gaming machine 1 and gaming manner of a baccarat game according to the first embodiment, a game progresses while the image of a dealer is displayed on the front display 21 and the amount of game media paid out as an award in each player terminal 4 is calculated on the basis of the bet information of the player and the result of the game and the amounts of the game media are stored in the RAM 42 (S6 and S7). When the accumulated amount of the stored game media has reached a predetermined amount (S9: YES), the image of the dealer displayed on the front display 21 is changed to a different dealer who is in correspondent with the reached accumulated amount (S11). Thus, the dealer who progresses the game is changed on the basis of the amount of the paid-out game media, and accordingly, it is possible to provide tensions and excitement to the player. In addition, as the amount of the paid-out game media increases, the dealer is changed by stages, and accordingly, it is possible to prevent the game from being monotonous and the player form being tired of the game.

In addition, when the player wins a game in a state that the image 104 of the dealer D is displayed on the front display 21, an award, the amount of which is higher than that in a case where the player wins the game in a state that one of the images 101 to 103 of dealers A to C other than the dealer D is displayed on the front display 21 is provided, and accordingly, it is possible to increase expectation of the player in an easy manner by only changing the image of the displayed dealer without changing a basic control process for the game. Thus, it is possible to reduce a load of the controller for a control operation. In addition, it is possible to increase eagerness of a player, who wishes to make a special dealer appear, for betting.

Second Embodiment

Next, a baccarat gaming machine according to a second embodiment of the present invention will be described with reference to FIG. 12. In descriptions below, a same reference numeral as that of the baccarat gaming machine 1 according to the first embodiment shown in FIGS. 1 to 11 represents a same part as or a part equivalent to that of the baccarat gaming machine 1 according to the first embodiment.

A schematic configuration of the baccarat gaming machine according to the second embodiment is almost the same as that of the baccarat gaming machine 1 according to the first embodiment. In addition, various control processes in the baccarat gaming machine according to the second embodiment are almost the same as those in the baccarat gaming machine 1 according to the first embodiment.

However, as the condition for changing the image of the dealer displayed on the front display 21 into an image of a different dealer, while a condition that the amount of the paid-out game media reaches a predetermined amount is used in the baccarat gaming machine 1 according to the first embodiment, a condition that a loss count that indicates the number of lost games of the players reaches a predetermined number is used in the baccarat gaming machine according to the second embodiment, which is different from the baccarat gaming machine 1 according to the first embodiment.

Figure 12:
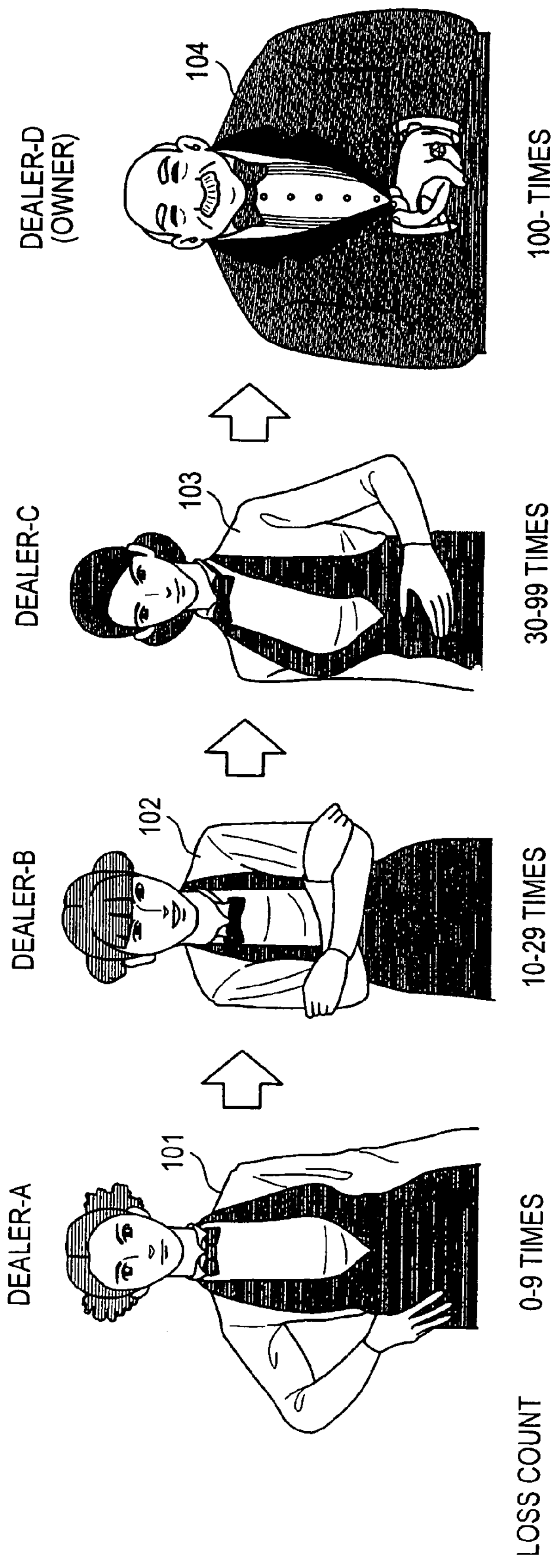
FIG. 12 is a diagram showing example images that are displayed in a baccarat gaming machine according to a second embodiment of the present invention.

As shown in FIG. 12, in the ROM 43 of the baccarat gaming machine 1 according to the second embodiment, the images 101-104 of dealers A-D are stored in correspondence with the numbers of lost games. In particular, the image 101 of dealer A is in correspondence with the number of the lost games of up to nine. The image 102 of dealer B is in correspondence with the number of the lost games in the range of 10 to 29. The image 103 of dealer C is in correspondence with the number of the lost games in the range of 30 to 99. The image 104 of dealer D is in correspondence with the number of the lost games equal to or greater than 100. Here, the player loses the baccarat game in a case where the player bets on the BANKER and the PLAYER wins or in a case where the player bets on the PLAYER and the BANKER wins. In the RAM 42, a count value resulting from counting the numbers of lost games (loss count) in each player terminal 4 is stored.

In the baccarat gaming machine according to the second embodiment, as a determination process of S9 of the main game processing program (FIG. 11), it is determined whether the number of the lost games in the player terminals 4 stored in the RAM 42 has reached one of predetermined numbers. When it is determined that the number of the lost games has reached one of the predetermined numbers, the CPU 41 selects an image of the dealer corresponding to the reached number of the lost games, from among the images 102 to 104 of the dealers B to D. In particular, when it is determined that the number of the lost games has reached 10, the image 102 of dealer B is selected. On the other hand, when it is determined that the number of the lost games has reached 30, the image 103 of dealer C is selected. On the other hand, when it is determined that the number of the lost games has reached 100, the image 104 of dealer D is selected. The CPU 41 controls the front display 21 to change the image of the dealer displayed thereon on the basis of the result of the selection.

In the process of S13 of the main game processing program (FIG. 11), when the initialization condition is satisfied, the CPU 41 initializes the count value, which is the number of lost games in the player terminals 4, stored in the RAM 42.

As described above, in the baccarat gaming machine and gaming manner of a baccarat game according to the second embodiment, a game progresses while the image of a dealer is displayed on the front display 21, the number of lost games in the player terminals 4 is counted on the basis of the bet information of the players and the result of the games, and the number of the lost games are stored in the RAM 42. When the number of the lost games has reached a predetermined number, the image of the dealer displayed on the front display 21 is changed to a different dealer corresponding to the reached number of the lost games. Thus, the dealer who progresses the game is changed on the basis of the number of the lost games of the player, and accordingly, it is possible to provide tensions and excitement to the player during the game. In addition, as the number of the lost games increases, the dealer is changed by stages, and accordingly, it is possible to prevent the game from being monotonous and the player form being tired of the games.

The present invention is not limited to the above-described embodiments, and it is apparent that various changes or modifications may be made therein without departing from the scope of the claimed invention.

For example, as the condition for changing the image of the dealer displayed on the front display 21, although a condition that the amount of the paid-out game media reaches a predetermined amount is used in the first embodiment and a condition that the number of lost games of the player terminals 4 reaches a predetermined number is used in the second embodiment, however, a condition other than the above-described two conditions may be used. For example, a condition that the payout rate becomes a predetermined rate may be used as the condition for changing the image of the dealer. Furthermore, a condition that the number of inserted medals becomes a predetermined number may be used as the condition for changing the image of the dealer.

Figure 13:
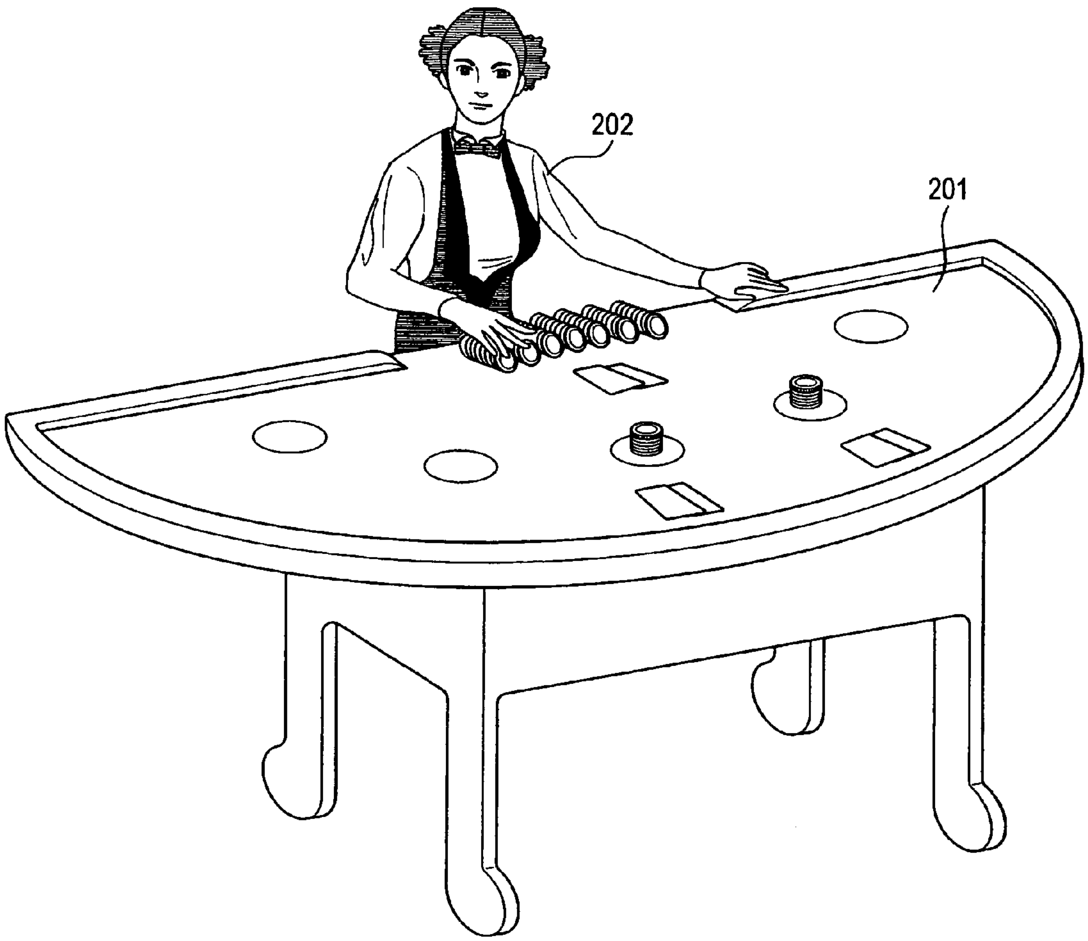
FIG. 13 is a schematic diagram showing a case where the present invention is applied to a table game.

In addition, a method for providing a game according to the present invention, as shown in FIG. 13, may be applied to a baccarat game (so-called table game) which is performed by a dealer 202 and a player (not shown in the figure) on a game table 201.

In the table game shown in FIG. 13, a player places a bet by placing chips on a predetermined area on the game table 201. When the amount of the chips paid-out to the players becomes a predetermined amount or the number of lost games of the players becomes a predetermined number, the dealer 202 is replaced with another dealer. Then, the game is progressed on the game table 201 by the new dealer 202. In a case where the player wins the game that is progressed by a special dealer 202 such as an owner of the casino, it is configured to award an award corresponding to an amount higher than that in a case where the player wins the game that is progressed by the other dealers. A detail of the method for providing a game is the same as that of the method provided by the gaming machines as described as the first and the second embodiments, except that dealing cards or paying out chips are directly performed by the dealer.

Furthermore, the card gaming machine and the method for providing a card game according to the present invention may be applied to a gaming machine or a method for performing a card game such as a blackjack game or any other type of poker games other than the Baccarat game or a type of table games such as a roulette game, a bingo game, or a dice game.

What is claimed is:

1. A gaming apparatus comprising:

a first memory that stores dealer images of a plurality of dealer characters;

a display device that displays a dealer image of one of the dealer characters;

a betting unit that receives a bet operation input by a player;

a second memory that stores a total amount of game media used for wagering in a game that is provided to the player as awards in accordance with results of a plurality of games that are performed based on the bet operation; and a controller that determines whether the total amount of game media provided in accordance with the results of the plurality of games has reached a predetermined amount and controls the display device to change the dealer image of the displayed dealer image of one of the dealer characters to another dealer image of one of the dealer characters when the controller determines that the total amount of game media has reached the predetermined amount, wherein the first memory stores the dealer images being associated with a plurality of predetermined amounts for each of the dealer characters, wherein the controller determines whether the total amount of game media has reached any one of the predetermined amounts and controls the display device to change the dealer image of the displayed dealer image of one of the dealer characters to the another displayed dealer image of one of the dealer characters that is associated with one of the predetermined amounts to which the total amount of game media has reached, wherein the first memory stores the dealer images of the dealer characters including a special dealer character, wherein the controller provides a first award to the player when the player wins the game while the dealer images of the special dealer character is displayed on the display device and a second award that is different from the first award to the player when the player wins the game while the dealer images of one of the dealer characters other than the special dealer character is displayed on the display device, wherein the first award is calculated by a special award calculation process and the second award is calculated by a normal award calculation process, wherein the second award calculated by the normal award calculation process is identical among the dealer characters other than the special dealer character, and wherein, when a result of one of the plurality of games is a predetermined result, the special award calculation process calculates the first award from a betted amount based on a first rate, and the normal award calculation process calculates the second award from the betted amount based on a second rate, the first rate being greater than the second rate.

2. The gaming machine of claim 1, wherein the second rate is identical among the dealer characters other than the special dealer character.

3. The gaming machine of claim 1, wherein the special award calculation process multiplies the betted amount by the first rate to output the first award, and the normal award calculation process multiplies the betted amount by the second rate to output the second award.

4. The gaming machine of claim 1, wherein the first rate is twice of the second rate.

* * * * *